Nov. 14, 1967   J. B. MOSELEY   3,352,396
DRIVE AND STOP CONTROL FOR A DRIVEN MACHINE
Filed June 22, 1965
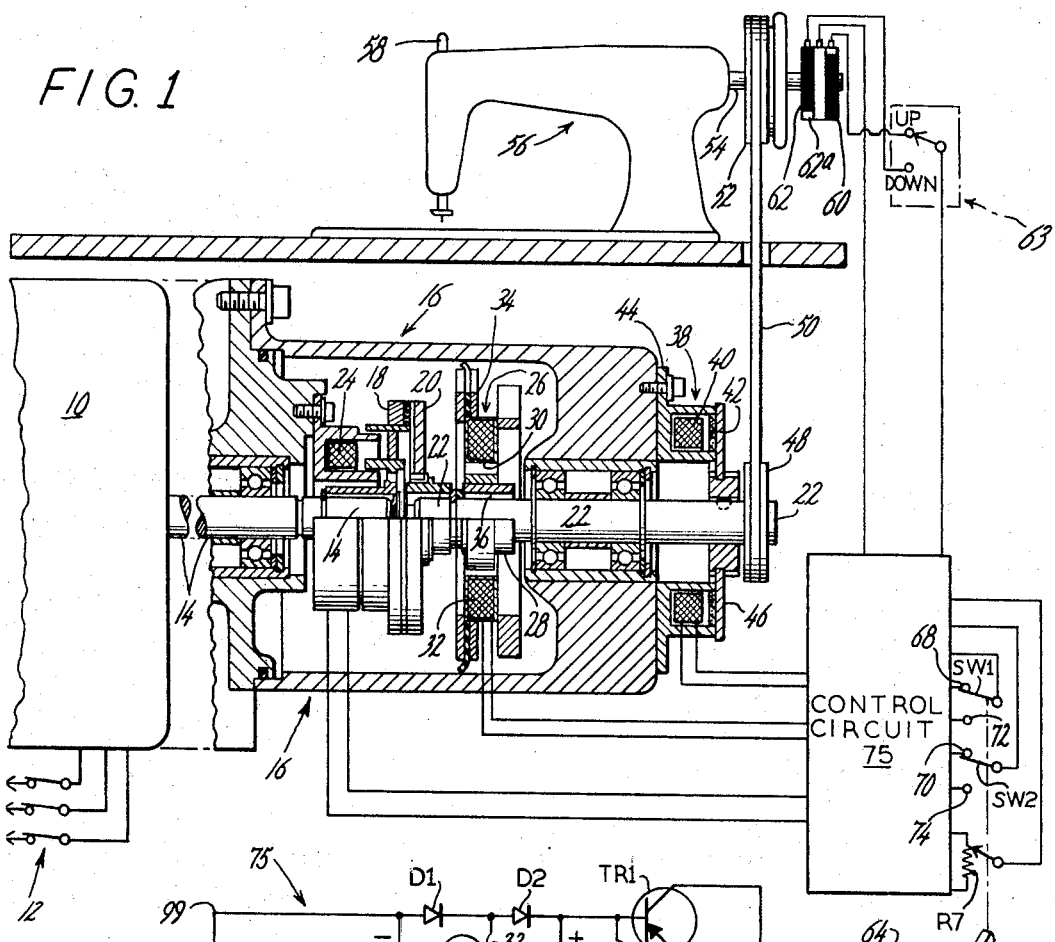
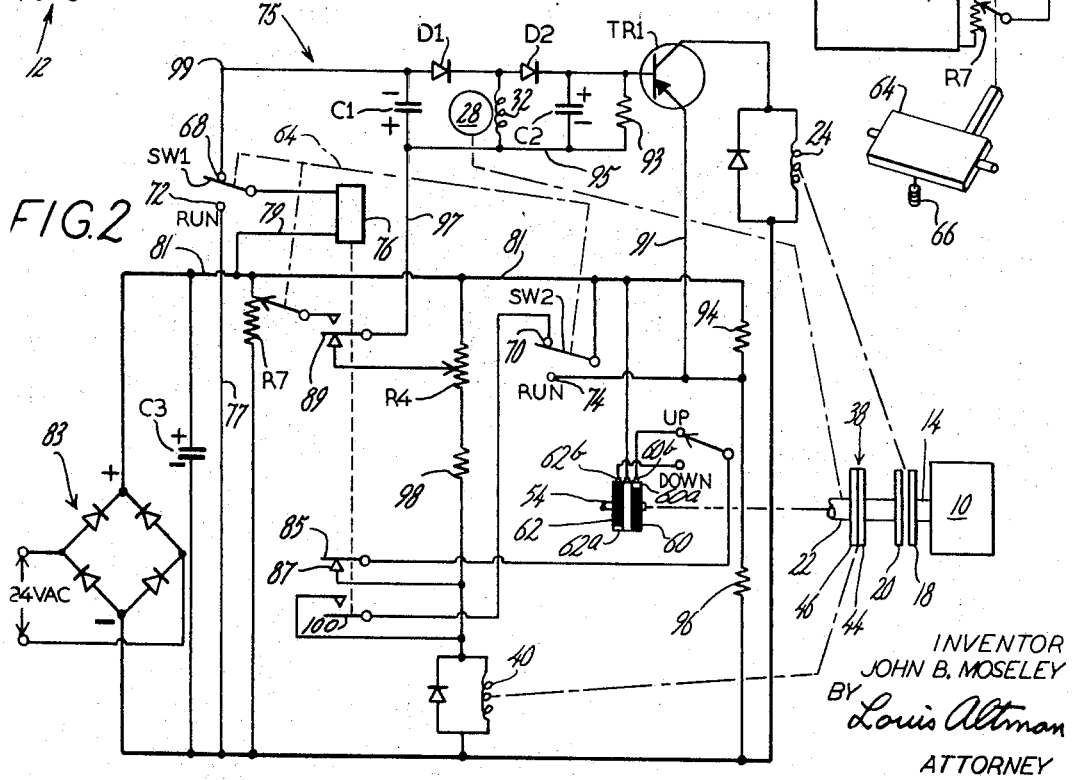
INVENTOR
JOHN B. MOSELEY
BY Louis Altman
ATTORNEY

United States Patent Office 3,352,396
Patented Nov. 14, 1967

3,352,396
DRIVE AND STOP CONTROL FOR A
DRIVEN MACHINE
John B. Moseley, Norfolk, Conn., assignor to General
Time Corporation, New York, N.Y., a corporation of
Delaware
Filed June 22, 1965, Ser. No. 465,902
5 Claims. (Cl. 192—142)

This invention relates to a controller for sewing machines or a similar driven machine and has particular utility in a system using a variable speed drive. The apparatus of this invention is ideally adaptable to the variable speed drive machine that constitutes the subject matter of application Ser. No. 238,968, filed Nov. 20, 1962, entitled, Driving Arrangement for Knitting Machines or the Like, invented by Thomas W. Rogerson and Gerald A. Sweeney and assigned to the same assignee as is the present application.

More specifically, the apparatus of the present invention relates to control of a variable speed drive unit which in addition to providing an adjustable and regulated output speed also provides a unique "stop" operation. That is, when a "stop" operation is instituted the main shaft of a driven machine will invariably come to a stop at a predetermined angular position. It has long been appreciated in the art encompassing industrial sewing machines, for example, that such operation is highly desirable when a wide range of operating speeds are required and that when a "stop" operation is instituted the main shaft of the sewing machine will be immediately arrested in such an attitude that the work needle will be retracted or remain situated in the work piece.

It has long been apparent that any attempt to obtain an accurate positional arrest of the main shaft of a driven machine by means of a simple braking action is futile as the exact position at which that shaft comes to rest depends for the main part on its initial speed, rotating inertia, load torque and braking torque. Since these factors inevitably vary, numerous attempts have been made to attain a control system that will situate the main shaft of a driven machine at a predetermined angular stop. Generally, such prior devices contain a main drive motor and a control motor or an auxiliary drive that is transferred into control when a "stop" operation is instituted. This makes for a cumbersome arrangement and usually entails modifying the driven machine. Such practice has proved to be objectionable. Other control attempts have been made by use of complex circuitry which necessitated expert adjustment and maintenance to achieve the desired result.

In the instant invention there is no shifting from a main drive motor to a control motor or to an auxiliary drive to attain the desired result; nor is complex circuitry in evidence. On the contrary, with the apparatus soon to be described, the desired result is achieved with extreme simplicity and without alteration of the driven machine. The control is substantially electric and employs a minimum of components.

To outline the operation of this invention, depression of the usual foot pedal or treadle associated with the machine, transfers a pair of switches to activate a relay and establish certain circuits. Concurrently, a potentiometer is adjusted and a particular voltage is applied to a first circuit. The magnitude of this voltage is dependent on the degree of depression of the treadle and is referred to as the reference voltage. The reference voltage is of the required polarity to cause current flow in a clutch coil. This current reaches a maximum value at a low value of reference voltage and does not change appreciably over the major range of voltage available from the potentiometer. Consequently, the clutch coil effects a substantial clutching torque between a drive shaft (alternately termed a first shaft) and a driven shaft (alternately termed a second shaft), which tends to accelerate the driven shaft to the same speed of rotation as the drive shaft. A tachometer generator is associated with the driven shaft, which functions to provide a voltage suitably processed and filtered by circuit components, to be described, that is proportional to the speed of the driven shaft. This voltage, referred to as the feedback voltage, is applied to a second circuit so as to oppose the reference voltage supplied by the first circuit.

Thus, when the speed of rotation of the output or driven shaft reaches a value such that the feedback voltage equals the reference voltage, further acceleration of the shaft is prevented and the output speed is thus regulated. When pressure is removed from the treadle, the switches return to their initial position. One switch couples a third circuit with the tachometer output to hold the relay energized. A second switch completes a circuit via a first swinger of the still energized relay to a brake coil that applies a magnetic brake to the driven or second shaft. The driven shaft tends to come to a stop and the output of the tachometer diminishes. The energy supplied by the third circuit is now insufficient to maintain the relay energized and it deenergizes thereby establishing a fourth circuit via second swinger thereof and a second potentiometer. This fourth circuit feeds the clutch coil at a lower potential than did the first circuit (now open) and the driven shaft is rotated at reduced speed. This is made possible as the first swinger of the relay opens the circuit to the brake coil when the relay deenergizes. A third swinger of the relay concurrently closes to establish an alternate circuit to the brake coil via a slip ring or contact means fixed on the main shaft of the driven machine. When the main shaft arrives at a predetermined position the alternate circuit to the brake coil is completed and the fourth circuit to the clutch coil is shunted. The brake is applied and the main shaft is positively arrested at the predetermined position.

Accordingly, it is the main object of this invention to provide a simple control for arresting the shaft of a driven machine at a predetermined position.

Another object is to attain such result by substantially electrical control.

In keeping with the above object, it is a further object to employ a minimum of components circuited in a novel arrangement.

Another object is to combine the stated control with a variable speed drive.

A further object is to use a single relay as a circuit control means to establish alternate circuits to a clutch coil and a brake coil which are magnetically coupled to effect driving and braking of a driven machine.

Consistent with the above object, it is a further object to arrange a tachometer in circuit with that relay to maintain a temporary circuit thereto for temporarily braking the main shaft of that machine.

A still further object is to provide a magnetic clutch and magnetic brake overlappingly circuited under control of that relay to effect absolute arresting of that machine shaft in a predetermined position.

A still further object is to provide a novel switching system under control of that relay and treadle of the machine whereby the shaft of a driven machine is automatically braked when rotating at a high speed, then the brake is automatically released, the shaft then rotated at a relatively slow speed, again automatically braked and arrested in a predetermined position.

A still further object is to provide in a control system, a first circuit to run the main shaft of a driven machine at a regulated speed, a second circuit to monitor the amount of current supplied to a magnetic clutch to maintain that regulated speed, a third circuit to temporarily apply an alternate energy path to a circuit control means, and a fourth circuit which is effective to run the main shaft of a driven machine at a reduced speed when a stop operation is instituted.

Other objects and advantages of the invention will be apparent from the following detailed description of the preferred embodiment illustrated in the accompanying drawings of which:

FIG. 1 is a diagrammatic illustration of the drive forming part of this invention drivingly coupled to the main shaft of a sewing machine and;

FIG. 2 is a wiring diagram schematically showing the control system.

Referring now to the drawings and particularly to FIG. 1, a motor 10 is activated when switches 12 are closed (as shown) to rotate an input or first shaft 14 at a constant speed. Shaft 14 is journaled within a housing 16 of a variable speed drive. Also within the housing 16 is a driving disc or rotor 18 which is secured to the motor driven input shaft 14. An armature 20, adapted to slide axially, is arranged on an output or second shaft 22 which is also journaled within the housing 16. A clutch coil 24 for setting up variable magnetic flux between the rotor 18 and armature 20 to thereby regulate the output torque and therefore the speed of the second shaft 22 is also provided within the housing 16. A tachometer or current generator, indicated at 26, is mounted adjacent the armature 20. The tachometer includes a rotor 28 and a stator 30 which mounts a coil 32. The stator is clamped in place by a retaining ring 34 while the rotor 28 is keyed to the output shaft 22, as at 36. The tachometer is of the commutatorless type producing an output voltage and frequency which varies directly with speed. When the tachometer rotor 28 is in a reference position, flux is caused to flow through the coil 32 in one direction and when the rotor is advanced through an incremental distance, flux is caused to flow through the coil in the opposite direction thereby generating an A-C wave.

The apparatus thus far described is disclosed in full detail in the above referred to application wherein the tachometer is an important feature thereof. The tachometer is also an important feature of the instant invention as will become apparent later on in this description.

Situated at the output side of the housing 16 is a magnetic brake, generally indicated at 38, having a coil 40 and a friction face 42 secured within a flanged container 44 which is fixed to the housing 16. A rotor or armature 46 which is arranged to slide axially with respect to shaft 22 effects braking of the output shaft 22 when coil 40 is energized and armature 46 is drawn into engagement with the stationary friction face 42. A sheave 48 is fixed to the output end of shaft 22 and by means of a belt 50 arranged on a second sheave 52 forms the connection or driving coupling to the main shaft 54 of the sewing or driven machine, generally designated at 56. Rotation of the shaft 54 causes oscillation of the sewing machine spindle or needle drive 58 in a well known manner. Fixed at one end of the main shaft 54 are a pair of slip rings or contact means 60 and 62 which serve to cause final arrest of the spindle 58 in a predetermined up or down position. How this result is achieved will be readily apparent when the particulars of the control circuit are described. A manual switch 63 is conveniently located to enable an operator to predeterminately choose whether the spindle 58 should be arrested in the up or down position when pressure is removed from a foot pedal or treadle 64 and a spring 66 returns treadle 64 to the position shown in the drawings.

As previously set out, the motor 10 is constantly driving the first shaft 14 when switches 12 are closed. However, so long as the treadle 64 is in the position shown, the output shaft 22 of the drive will be braked and therefore the main shaft 54 of the sewing machine idle. When the treadle 64 is depressed switches SW1 and SW2 are transferred from their upper contacts 68 and 70 to their lower contacts 72 and 74, respectively. Initial depression of treadle 64 causes this action and simultaneously adjusts a potentiometer designated R7. Briefly stated, the further the treadle is depressed, the faster the output shaft runs and at full depression, the output shaft runs at full motor speed.

With particular reference to FIG. 2 and the control circuit, generally indicated at 75, transfer of SW1 to the lower contact 72 causes a relay 76 to be energized via a negative conductor 77, the circuit through relay 76 being completed by way of conductors 79 and 81 back to the positive input emanating from a full wave rectifier 83. When relay 76 energizes, a third swinger 85 thereof opens with respect to contact 87, which opens the circuit to the brake coil 40 and thereby releases the brake 38. An alternate circuit to the brake coil 40 becomes impotent when switch SW2 concurrently transfers from contact 70 to contact 74. A second swinger 89 of relay 76 also transfers with swinger 85 thus putting potentiometer R7 into a speed regulating or first circuit. With the potentiometer R7 now adjusted, a speed regulating circuit is established from conductor 81, switch SW2 which is now transferred to contact 74, conductor 91, to the emitter-base of a transistor TR1, through a resistor 93, a conductor 95, a connection 97, swinger 89 and potentiometer R7. This first circuit causes an amplified current flow from the emitter to the collector of TR1 and thereby energizes the clutch coil 24 via conductor 95. The flux generated by coil 24 results in a clutching torque which couples the first shaft to the second shaft. The tachometer rotor 28 which is keyed to the output shaft now accelerates toward the speed of the input shaft. Subsequently, the A-C wave generated by the tachometer influences a second circuit comprising a capacitor C2 and a rectifier D2. This second circuit output eventually equals and opposes the voltage developed by the reference supply across the resistor 93. That is, when the tachometer rotor comes up to the speed dictated by the potentiometer R7, transistor TR1 is biased off by C2. At that point, equal currents are impressed in both directions through resistor 93 so that net current flow is terminated, the clutch coil 24 is deenergized, and the driven shaft 22 and tachometer rotor 28 tend to slow down. Consequently, current provided by the tachometer to resistor 93 diminishes whereupon the reference voltage again commences to conduct through the potentiometer R7, reactivating TR1. In this manner the speed of shaft 22 is stabilized. Thus the second circuit provides a current monitor for the control to govern the speed of the output shaft 22 and, consequently, the main shaft 54 of the driven machine to which it is drivingly coupled.

Stopping of the output shaft 22 and consequently the main shaft 54 of the driven machine is effected by releasing pressure on the treadle 64. With such release the potentiometer R7 is thus moved to the upper or off position. Simultaneously, switches SW1 and SW2 are transferred to their contacts 68 and 70, respectively. Switch SW1 transfers the circuit to relay 76 from conductor 77 and contact 72 to an alternate circuit comprising contact 68, a conductor 99, a capacitor C1 and a rectifier D1, herein termed a third circuit. This circuit remains effective to hold relay 76 energized until the output shaft 22 reaches a predetermined lower speed. Such a speed may be approximately 100 r.p.m., which is set out purely as an example. At such speed, the tachometer rotor 28 fails to induce coil 32 sufficiently to adequately charge capacitor C1 and sustain the relay 76 energized.

Concurrent with the transferral of SW1 and before the drop of relay 76, switch SW2 transfers from contact 74 to contact 70 and opens the first circuit to transistor TR1. It is important to note that a momentary circuit is completed to the brake coil 40 via switch SW2, contact 70, and a first swinger 100 of relay 76. With the brake applied, output shaft immediately decelerates toward a stop and the tachometer rotor rotating therewith approaches the 100 r.p.m. example speed. Now the charge on C1 is insufficient to sustain relay 76 and it deenergizes. Swinger 100 opens and the circuit to brake coil 40 is broken. Concurrently, swinger 89 returns to the position shown, bypasses the first circuit which was previously opened when switch SW2 transferred to contact 70, and establishes a slow speed circuit, herein termed a fourth circuit, to the clutch coil 24. This circuit includes a portion of set potentiometer R4, swinger 89, conductors 97, 95, resistor 93, transistor TR1, conductor 91, a resistor 94 and conductor 81 back to potentiometer R4.

The adjustable potentiometer R4 is set to impress a voltage across resistor 93 of approximately the same magnitude as that provided by the tachometer and the third circuit at the instant it decreases from a value sufficient to sustain the relay in the energized state. By the regulating means previously described, the driven shaft 22, the main shaft and the slip rings 60, 62 fixed thereon rotate at a relatively slow speed until a contact portion 60$^a$ or 62$^a$, respectively, advance to engage a brush 60$^b$ or 62$^b$. If it is desired to arrest the needle drive 58 in the up position, the position switch is set at the "up" indication, as shown. When contact portion 60$^a$ engages brush 60$^b$ a circuit to the brake coil 40 is completed via swinger 85 and the fourth or slow speed circuit through potentiometer R4 is shunted. The output shaft 22 is braked to an immediate stop and the needle drive 58 is positively arrested in the up position. If it is desired to arrest the needle drive in the down position, the simple action of moving the position switch to the "down" indication before instituting the stop acion is all that is required.

Wihout intending to limit the invention, the control components disclosed have the following circuit values:

| | |
|---|---|
| Relay 76 (Potter Brumfield) | Type KA5DY |
| Transistor TR1 | Type 2N1535 |
| Resistor 93 | kilohms 1 |
| Resistor 94 | ohms 10 |
| Resistor 96 | do 470 |
| Potentiometer R4 | kilohms 5 |
| Resistor 98 | ohms 470 |
| Potentiometer R7 | kilohms 2.5 |
| Capacitor C1 | microfarads 10 |
| Capacitor C2 | do 10 |
| Capacitor C3 | do 250 |
| All Diodes | ½ amp—100 P.I.V. |

It will be seen that the objects set forth above, among those made apparent from the preceding description, are efficiently attained and, since certain changes may be made in the above control system without departing from the scope of the invention, it is intended that all matter contained in the above description or shown in the accompanying drawings should be interpreted as illustrative and not in a limiting sense.

Having described my invention, what I claim as new and desire to secure by Letters Patent is:

1. A drive machine operable at variable speeds having a control for arresting the main shaft of a driven machine at a predetermined position, comprising in combination:
   a magnetic clutch having an input and an output shaft forming part of said drive machine,
   means drivingly coupling said output shaft to said main shaft to operate said main shaft at a preset speed,
   a faced disc of magnetic material on said input shaft,
   a faced disc of magnetic material on said output shaft,
   a control circuit adapted to be switched to "ON" and "OFF" conditions,
   means including a clutch coil
      for varying the magnetic attraction between said discs to vary the speed of said output shaft,
   said control circuit including circuit means for establishing a reference current to monitor the current supplied to said clutch coil and maintain said preset speed of said main shaft,
   a tachometer generator
      associated with said output shaft adapted to generate a variable current to said clutch coil dependent upon the speed of said output shaft,
   control means
      for said circuit normally deactivated but activated when said control circuit is switched to "ON" condition,
   a magnetic brake
      for engaging said output shaft, said brake being normally activated but being deactivated when said control circuit is switched to "ON" condition,
   means including said tachometer generator
      to temporarily hold said circuit control means activated when said control circuit is switched to "OFF" condition,
   means governed by said control means
      to cause temporary application of said brake when said control circuit is switched to "OFF" condition,
   and means on said main shaft
      when it arrives at said predetermined position to cause reapplication of said brake to thereby arrest said main shaft at said predetermined position.

2. A drive machine operable at variable speeds having a control for arresting the main shaft of a driven machine at a predetermined position, comprising in combination:
   a magnetic clutch having an input and an output shaft forming part of said drive machine,
   means drivingly coupling said output shaft to said main shaft to operate said main shaft at a preset speed,
   a faced disc of magnetic material on said input shaft,
   a faced disc of magnetic material on said output shaft,
   means including a clutch coil
      for varying the magnetic attraction between said discs to vary the speed of said output shaft,
   a tachometer generator
      associated with said output shaft adapted to generate a variable current to said clutch coil dependent upon the speed of said output shaft,
   a fast run and a slow run circuit for said coil,
   circuit means for establishing a reference current to monitor the current supplied to said clutch coil and maintain said preset speed of said main shaft,
   control means for said circuits
      being normally deactivated but being activated when said fast run circuit is enabled,
   a magnetic brake
      for engaging said output shaft,
   means including said tachometer generator
      to temporarily hold said control means activated when said fast run circuit is disabled,
   means effective upon deactivation of said control means
      for causing release of said brake and enablement of said slow run circuit,
   and means on said main shaft
      when it arrives at said predetermined position to cause reapplication of said brake and shunting of said slow run circuit to thereby arrest said main shaft at said predetermined position.

3. The combination defined in claim 2 wherein said fast run circuit includes an adjustable potentiometer and said slow run circuit includes a set potentiometer, said set potentiometer being coupled to said clutch coil upon deactivation of said control means and being decoupled when said brake is applied at said predetermined position of said main shaft.

4. The combination defined in claim 2 wherein said control means includes a relay having
   a third swinger
      for allowing energization of said brake coil when said main shaft is at said predetermined position,
a second swinger
for enabling said fast run circuit and disabling said slow run circuit when said relay is energized,
and a first swinger
for causing temporary energization of said brake coil when said fast run circuit is disabled and before said slow run circuit is enabled.

5. A drive machine operable at variable speeds having a control for arresting the main shaft of a driven machine at a predetermined position, comprising in combination:
a first shaft and a second shaft
forming part of said drive machine, means drivingly coupling said second shaft to said main shaft,
said second shaft being adapted to rotate at preset speeds,
a clutch coil
to effect magnetic clutching of said first and second shafts,
a tachometer generator
associated with said second shaft,
a first circuit
adapted to alter the current supplied to said clutch coil to effect varying degrees of said magnetic clutching,
switches
movable to "ON" and "OFF" positions for activating and deactivating said first circuit,
means
to move said switches,
circuit control means
being normally deactivated but being activated when said switches are moved to "ON" position by said switch moving means,
a second circuit and a third circuit
affected by said generator,
said second circuit establishing a reference current monitoring the current supplied to said clutch coil to maintain said preset speed of said second shaft,
said third circuit
coupled to said circuit control means when said switches are moved to "OFF" position by said switch moving means and maintaining said circuit control means activated so long as said second shaft is rotated at a predetermined speed,
a fourth circuit
activated by said circuit control means when said switches are moved to "OFF" position by said switch moving means to partially energize said clutch coil and cause rotation of said main shaft at a speed slower than said predetermined speed,
a magnetic brake
adapted to arrest said second shaft when said switches are moved to "OFF" position by said switch moving means,
a brake coil
for said brake energized then deenergized when said switches are moved to "OFF" position by said switch moving means to apply then release said brake,
and contact means
on said main shaft when it arrives at said predetermined position to cause reenergization of said brake coil and shunt said fourth circuit to thereby arrest said main shaft at said predetermined position.

References Cited
UNITED STATES PATENTS

| | | | |
|---|---|---|---|
| 2,920,221 | 1/1960 | Schwab | 112—219 X |
| 3,174,450 | 3/1965 | Becker et al. | 112—219 |
| 3,253,561 | 5/1966 | Block | 112—67 |
| 3,253,563 | 5/1966 | Myers | 112—220 |
| 3,268,047 | 8/1966 | Grygers et al. | 112—219 X |

PATRICK D. LAWSON, *Primary Examiner.*

H. H. HUNTER, *Assistant Examiner.*